(12) United States Patent
Hamburg (10) Patent No.: US 7,567,705 B1
(45) Date of Patent: *Jul. 28, 2009

(54) PROTECTING COLORS FROM CLIPPING (75) Inventor: Mark Hamburg, Scotts Valley, CA (US)

(73) Assignee: Adobe Systems Incorporated, San Jose, CA (US)

(*) Notice: Subject to any disclaimer, the term of this patent is extended or adjusted under 35 U.S.C. 154(b) by 93 days.

This patent is subject to a terminal disclaimer.

(21) Appl. No.: 11/773,116

(22) Filed: Jul. 3, 2007

Related U.S. Application Data (63) Continuation of application No. 10/300,656, filed on Nov. 19, 2002, now Pat. No. 7,283,662.

(51) Int. Cl.
G06K 9/00 (2006.01)

(52) U.S. Cl. ........................................ 382/162
(58) Field of Classification Search .................. None
See application file for complete search history.

(56) References Cited

U.S. PATENT DOCUMENTS

| 5,363,218 | A | 11/1994 | Hoshino |
| 5,438,649 | A | 8/1995 | Ruetz |
| 5,450,216 | A | 9/1995 | Kasson |
| 5,485,558 | A | 1/1996 | Weise et al. |
| 5,539,540 | A | 7/1996 | Spaulding et al. |
| 5,574,666 | A | 11/1996 | Ruetz et al. |
| 5,731,818 | A | 3/1998 | Wan et al. |
| 5,903,275 | A | 5/1999 | Guay |
| 5,937,089 | A * | 8/1999 | Kobayashi ................ 382/167 |
| 6,185,004 | B1 | 2/2001 | Lin et al. |
| 6,269,184 | B1 | 7/2001 | Spaulding et al. |
| 6,349,146 | B2 | 2/2002 | Roetling |
| 6,384,836 | B1 | 5/2002 | Naylor et al. |
| 6,400,843 | B1 | 6/2002 | Shu et al. |
| 6,571,001 | B2 | 5/2003 | Murphy |
| 6,571,011 | B1 | 5/2003 | Andresen et al. |
| 6,719,392 | B2 | 4/2004 | Qiao |
| 6,850,342 | B2 * | 2/2005 | Woolfe et al. ............. 358/1.9 |
| 6,894,806 | B1 * | 5/2005 | Woolfe et al. ............. 358/1.9 |

OTHER PUBLICATIONS

Vrhel, M.J.; Trussell, H.J., "Color device calibration: a mathematical formulation"; Image Processing, IEEE Transactions, vol. 8, issue 12, Dec. 1999 pp. 1796-1806.

* cited by examiner

Primary Examiner—Matthew C Bella
Assistant Examiner—Yuzhen Ge
(74) Attorney, Agent, or Firm—Fish & Richardson P.C.

(57) ABSTRACT

Methods and apparatus, including computer program products, for protecting colors from being clipped during color adjustment. A first set of colors is identified in a source color space, and a first color mapping is specified to associate colors in the source color space with mapped colors. The first set of colors and the first color mapping are used to construct a third color mapping that can be represented as a concatenation of an injective second color mapping with the first color mapping. The third color mapping is constructed such that each color in the first set of colors is associated with a mapped color inside a destination color space.

18 Claims, 5 Drawing Sheets

PROTECTING COLORS FROM CLIPPING

CROSS-REFERENCE TO RELATED APPLICATIONS

This application is a continuation and claims the benefit under 35 U.S.C. § 120 of pending U.S. application Ser. No. 10/300,656, filed on Nov. 19, 2002, the entire contents of which are incorporated here by reference.

BACKGROUND OF THE INVENTION

The present invention relates to adjusting colors in digital images.

In a digital image, colors are represented by a set of color components of a color space. Examples of color spaces include RGB colors using red, green, and blue ("RGB") components; CMYK colors using cyan, magenta, yellow, and black ("CMYK") components; or Lab colors using scientifically defined components. A color space is typically finite and restricted to a representable range of values in each color component. For example, an RGB color space can be represented by a "cube" where each component has a value between 0.0 and 1.0.

Colors in digital images can be adjusted by using computer based technologies, such as the Adobe® Photoshop® image editing software, available from Adobe Systems Incorporated of San Jose, Calif., to achieve coloring effects, corrections, or color matching in different images. For example, image contrast can be increased by "stretching out" colors in a limited region to a larger region in a color space that represents colors in the image. Similarly, the image contrast can be decreased by "compressing" a region in the color space. Alternatively, colors can be "cast," i.e., biased, to make an image, e.g., greener; inversely, a color cast in an image can be corrected or removed.

A color adjustment can be generated by a color mapping that associates colors in the image with mapped colors. Based on the associated mapped color, a color in the image can be adjusted, i.e., replaced with the mapped color, if the mapped color can be represented in the image. When a color mapping provides a mapped color that is outside of the color space, e.g., a RGB component is out of the available range of 0.0 to 1.0, the mapped color is typically "clipped" to a color within (e.g., at the boundary of) the color space. For example, a negative RGB value can be clipped to, i.e., replaced with, 0.0 due to the adjustment. As a result of the clipping, information may be lost in the adjusted image when originally distinct colors are clipped to the same color.

SUMMARY OF THE INVENTION

The invention provides methods and apparatus for protecting colors from being clipped during color adjustments. In general, in one aspect, the invention provides methods and apparatus, including computer program apparatus, implementing techniques for mapping colors. The techniques include identifying a first set of colors in a source color space, specifying a first color mapping, and using the first set of colors and the first color mapping to construct a third color mapping. The first color mapping associates colors in the source color space with mapped colors. The third color mapping can be represented as a concatenation of an injective second color mapping with the first color mapping. The third color mapping is constructed such that each color in the first set of colors is associated with a mapped color inside a destination color space.

Advantageous implementations can include one or more of the following features. The first color mapping can associate one or more colors in the first set of colors with mapped colors outside of the destination color space. A second set of colors can be specified in the destination color space, and the third color mapping can be constructed such that the second color mapping associates each color in the second set of colors only with colors in the second set of colors. The second set of colors can include only neutral colors.

The source color space can include the destination color space. The source color space can be an RGB color space. The destination color space can be defined by different color components than the source color space. The destination color space can be defined by different color component value ranges than the source color space. The third color mapping can be constructed such that the colors in the first set of colors are associated with colors corresponding to an optimal contrast in the destination color space.

Specifying a first color mapping can include defining a first color mapping that associates a light source color with a light mapped color and a dark source color with a dark mapped color. The light source color can represent a light color in an image and the dark source color can represent a dark color in the image. The light mapped color and the dark mapped color can be neutral colors. The light mapped color can represents white and the dark mapped color can represent black. The light source color and the dark source color, and/or the light mapped color and the dark mapped color can be specified based on user input. The light source color and the dark source color can be calculated from colors in the image. Identifying a first set of colors in a source color space can include identifying a range of color values in each of a plurality of color components defining the source color space. Using the first set of colors and the first color mapping to construct a third color mapping can include mapping each of the color ranges according to the first color mapping to define mapped color range values; identifying a minimum value and a maximum value of the mapped color range values; defining a second color mapping that is operable to transform the minimum value to the dark mapped color in each color component and the maximum value to the light mapped color in each color component; and defining the third color mapping as a function of the first color mapping and the second color mapping. The second color mapping can be a linear mapping. Colors in an image can be adjusted according to the third color mapping. The colors in the first set of colors can be updated according to the adjustment.

In general, in another aspect, the invention provides methods and apparatus, including computer program apparatus, implementing techniques for mapping colors. The techniques include identifying a first set of colors, receiving a selection of a light and a dark source color, defining a first color mapping, and using the first set of colors and the first color mapping to construct a third color mapping. The first set of colors is identified in an RGB color space by a range of color values in each of Red, Green, and Blue components of the RGB color space. The light and the dark source color represent a light and a dark color in an image, respectively. The first color mapping associates colors in the RGB color space with mapped colors described by Red, Green, and Blue components. The first color mapping associates the light source color with a light neutral color and the dark source color with a dark neutral color, and one or more colors from the first set of colors with mapped colors outside of the RGB color space. The third color mapping can be represented as a concatenation of an injective second color mapping with the first color mapping. The third color mapping is constructed such that each color in the first set of colors is associated with a mapped color inside the RGB color space, and each color that is associated with a neutral color according to the first color mapping is associated with a neutral color according to the third color mapping. In particular implementations, the light neutral color can be white and the dark neutral color can be black.

The invention can be implemented to realize one or more of the following advantages. A set of colors can be specified that will be protected from being clipped as a result of a color adjustment. The set of protected colors can be specified by a user, or automatically—based, for example, on characteristics of the image. A color mapping can be specified independently from the set of protected colors. A complex contrast enhancing mapping can be specified in two simple steps: specifying a first color mapping that approximates a desired effect; and identifying a set of colors that will be protected from clipping as a result of the mapping. The first color mapping and the set of protected colors can be used to construct a contrast enhancing mapping such that the protected colors in the set will not be clipped. The specified color mapping can be automatically modified to avoid clipping the set of protected colors. The modified mapping can optimize contrast. The modified mapping can preserve an effect of the original mapping. The modification can protect color details encoded in colors of the image from being lost due to the adjustment. The adjustment can be used to create, change, or remove a color cast without losing detail in the image.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
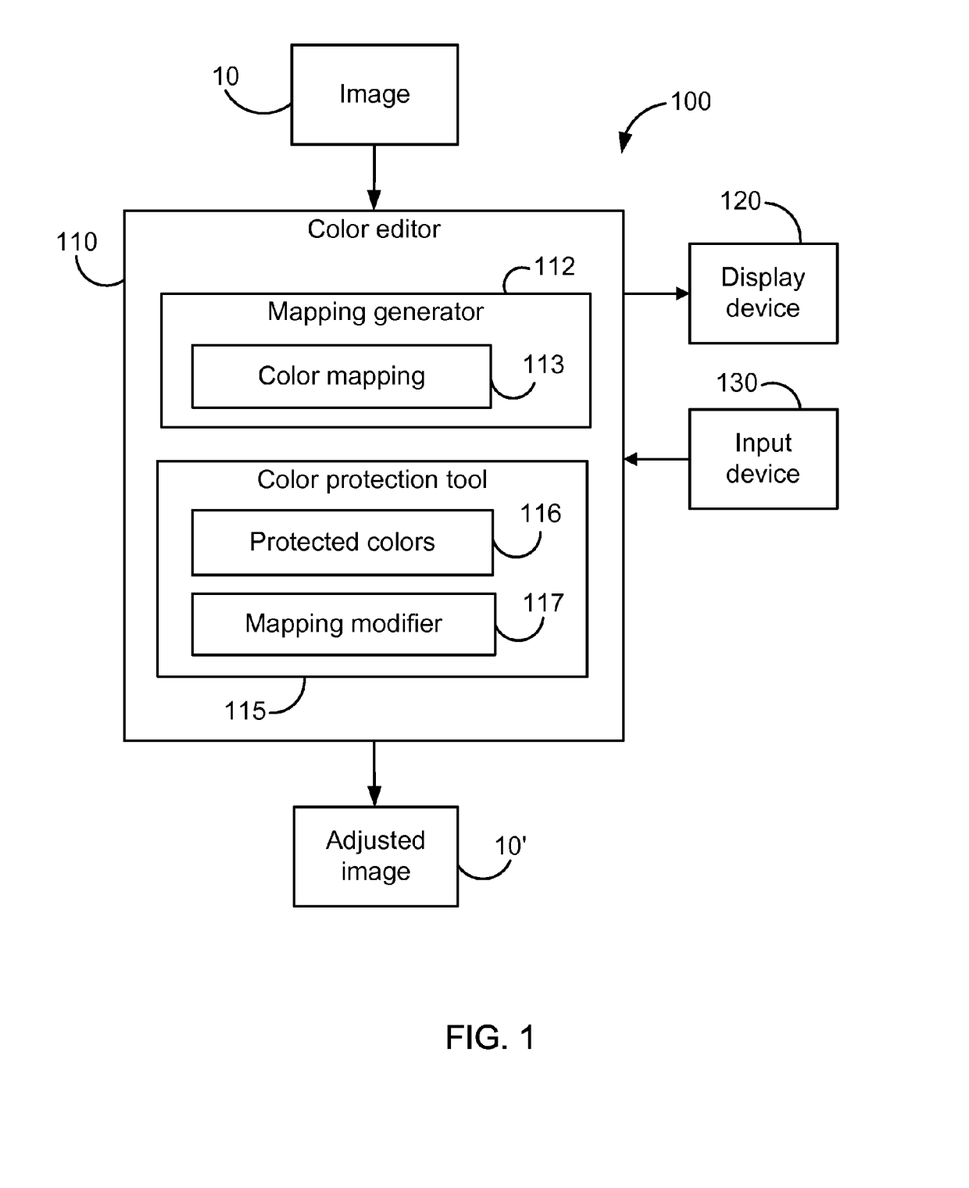
FIG. 1 is a block diagram showing a system for adjusting colors in an image in accordance with one aspect of the invention.

FIG. 1 shows an image processing system 100 that is operable to adjust colors in an image 10 to provide an adjusted image 10'. By specifying a set of protected colors, the system 100 can protect colors in the image from being clipped due to the adjustment. The system 100 includes a color editor 110, a display device 120, and an input device 130. The color editor 110 can adjust colors in the image 10 and use the display device 120 and the input device 130 to inform a user about details of the color adjustment and to receive user input, respectively.

The color editor 110 includes a mapping generator 112 and a color protection tool 115. The mapping generator 112 specifies a color mapping 113 and the color protection tool 115 modifies the color mapping 113 to avoid clipping protected colors. Based on the modified mapping, the color editor 110 can adjust colors in the image 10 without clipping colors corresponding to the protected colors.

The mapping generator 112 can specify a color mapping 113 that associates source colors in a color space with mapped colors. The source colors are represented by a value for each of a set of color components that define the color space. The same color components can be used for the mapped colors, but the mapped colors are not restricted to component values inside the color space. Because there is no restriction to map colors to mapped colors within the color space, the color mapping 113 can be specified by simple analytic expressions or by the specification of a collection of sample points. However, the mapped colors outside of the representable range of the color space will be clipped when colors in an image are adjusted according to the specified mapping. Specifying color mappings is discussed in detail with reference to FIGS. 2 and 4A.

The color protection tool 115 identifies a set of protected colors 116 and specifies a mapping modifier 117. The set of protected colors 116 designates colors that will be protected from being clipped due to a color adjustment. The protected set 116 can be designated as individual colors (identified, e.g., by specific color values in each of the color components of the color space), a color space region (identified, e.g., by a range of values in each of the color components), or a combination of individual colors and a region of the color space. Optionally, the protected region can include one or more subregions that may or may not overlap. Identifying protected colors is discussed in detail with reference to FIGS. 2 and 3 below.

The mapping modifier 117 modifies the color mapping 113 such that any protected color in the set 116 will be associated with a mapped color inside the color space. The modified mapping that results from application of the mapping modifier 117 to the color mapping 113 generates a color adjustment that does not clip any protected color in the set 116. In general, the modified mapping will have the same effect on the image as the mapping 113. For example, if the mapping 113 removes a color cast, the modified mapping will generally remove the same color cast and protect details in color shades from being lost. Modifying color mappings, including formulation of how to preserve the effect of the specified mapping, is discussed in detail with reference to FIGS. 2, 4A and 4B.

Figure 2:
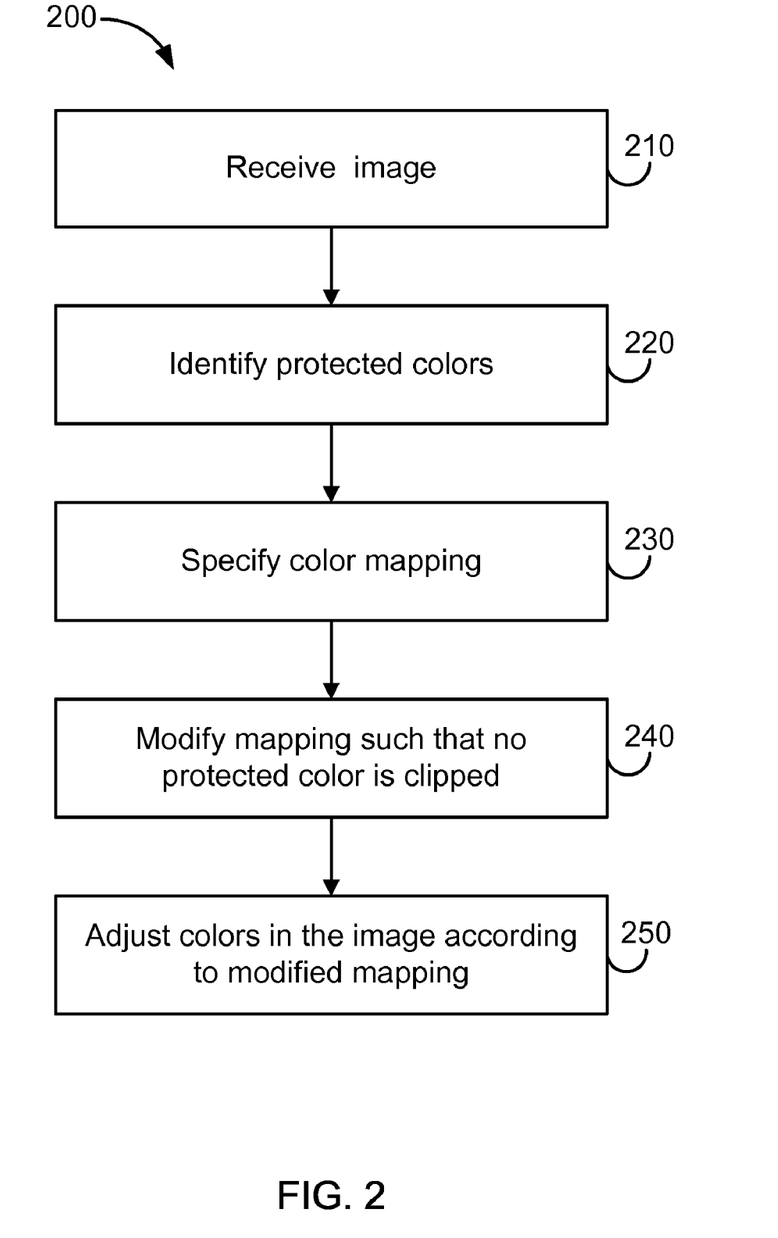
FIG. 2 is a flow diagram showing a method for adjusting colors in an image in accordance with one aspect of the invention.

FIG. 2 shows a method 200 for adjusting colors in an image in accordance with one aspect of the invention. The method 200 can be performed, for example, by the system 100 (FIG. 1) to protect colors in the image from being clipped during a color adjustment.

The system receives an image (step 210). Colors in the image are represented by color values for color components of a color space. The image can be received from a local data storing device or from any other source, e.g., through a computer network, such as a local or wide area network, or the Internet. The image can be in any format, including bit-mapped graphics (also referred to as raster graphics) and vector graphics (also referred to as object-oriented graphics) formats. In bit-mapped graphics, the image is represented by an array of pixels, where each pixel in the array is characterized by one or more bits, typically describing a color of the pixel. In vector graphics, the image can be represented by mathematical formulas that define shape of objects in the image and corresponding instructions to color the objects.

The system identifies protected colors (step 220) in the color space of the image. The system 100 (e.g., the color protection tool 115 of the color editor 110 (FIG. 1)) can identify protected colors based on user input, an analysis of colors in the image, or a combination thereof. For example, the system can identify protected colors automatically based on the result of a color analysis. A method for analyzing colors is discussed in detail with reference to FIG. 3.

A user can specify one or more protected colors, or a protected region in the color space. For example, the user can specify a protected region by identifying protected ranges in each color component of the color space. In one implementation, the color protection tool can use a graphical user interface ("GUI") to identify protected colors. For example, the GUI can present the received image to the user on the display device 120, and the user can specify protected colors by selecting different colors in the image with a pointing device such as a mouse. Alternatively (or in addition), the GUI can present a set of sliders (e.g., two sliders for each color component, one for specifying a minimum value and another for specifying a maximum value of the color component) upon which the user can designate a protected range. In one implementation, a protected region can be identified by selecting a light and a dark color in the image: the protected region will be defined by protected ranges between the dark and the light color's value in each component.

The system specifies a color mapping (step 230). For example, the mapping generator 112 can specify the color mapping 113 (FIG. 1). The mapping can be specified based on or in response to input from a user—for example, input identifying a color cast to be corrected or applied in the image. Optionally, the system can analyze colors in an image to obtain parameters for a mapping. For example, the system can use a histogram technique, similar to the one discussed below with reference to FIG. 3, to determine typical darkest and lightest colors for contrast adjustment.

The specified color mapping associates source colors with mapped colors. The mapped colors can be inside or outside of the color space. For a color space with N color components, i.e., $c_1, \ldots, c_N$, a general color mapping M can be defined by N component mappings, i.e., $M_1, \ldots, M_N$. The i-th component mapping $M_i$ provides a mapped value for the i-th color component as a function of a source color in the color space. Typically, each component mapping $M_i$ is a general function of all components of the source color, i.e., $M_i = M_i(c_1, \ldots, c_N)$.

In one implementation, the mapping generator specifies separable linear color mappings. A color mapping is separable if, for each color component, the mapped component value ("$mc_i$") depends only on the same component $c_i$ of the source color, i.e., $mc_i = M_i(c_i)$ for all $i=1, \ldots, N$.

A separable mapping is linear, if each component mapping $M_i$ is a linear function, i.e., $M_i(x) = a_i * x + b_i$, where $a_i$ and $b_i$ are parameters of the linear color mapping. By using separable mappings to generate color adjustments, the system can easily protect all colors in a rectangular region from being clipped: the entire rectangular region will be protected if the system protects the colors at the corners of the rectangular region.

Figure 4A:
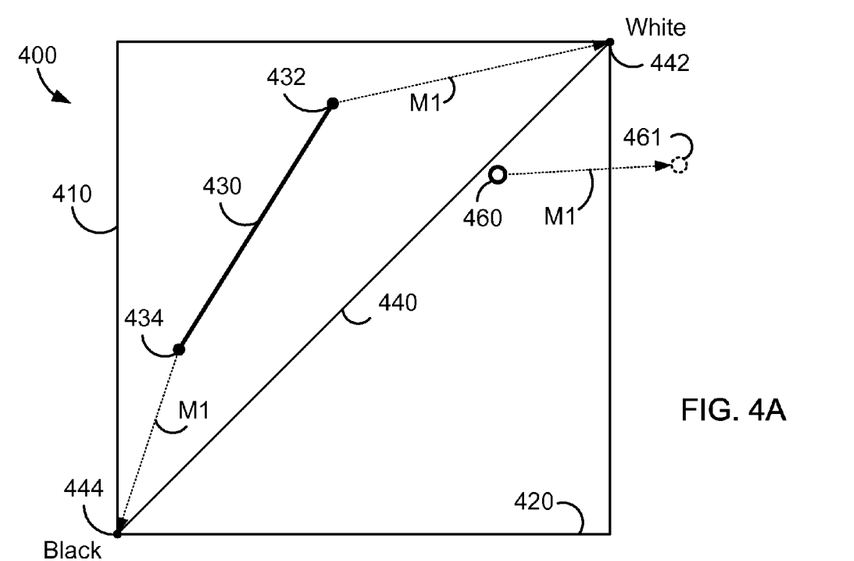
FIGS. 4A and 4B schematically illustrate one example of a set of color mappings according to one aspect of the invention.
Figure 4B:
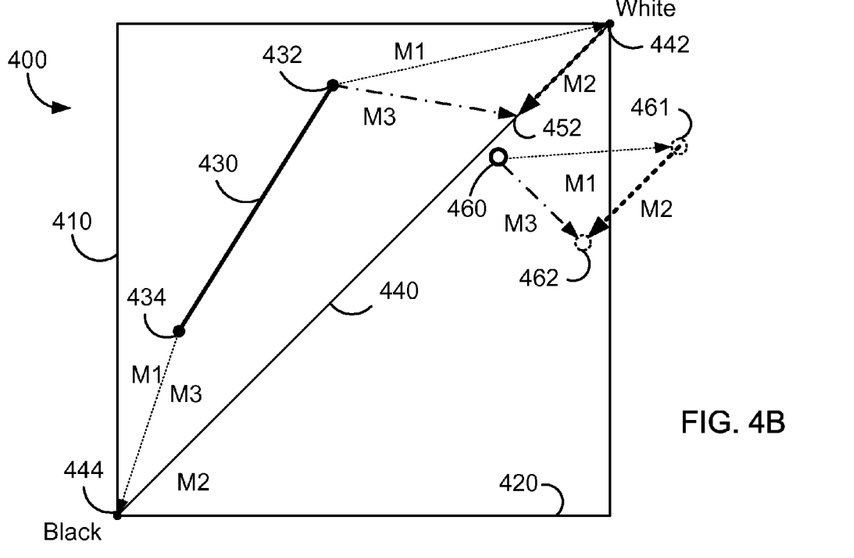

The parameters of a linear color mapping can be specified by two color pairs: a pair of input colors and a corresponding pair of output colors. For example, to remove a color cast from an image, an input pair can include an input "black" and an input "white" that should correspond to black or white, but do not because of an unwanted color cast. By standard techniques, such as described in, e.g., D. Blatner & B. Fraser, *Real World Adobe Photoshop 7* (2002), the mapping generator can calculate a linear mapping that maps the input black and white colors to an output pair including the true black and white colors, respectively. In one implementation, the system 100 can be configured to allow the user to specify an output color pair other than black and white, for example, in order to match colors in two images. An exemplary mapping to remove color cast is illustrated in FIGS. 4A and 4B.

The specified color mapping can define a color relation among a set of mapped colors. For example in RGB color space, a color cast removing mapping can define a set of neutral mapped colors as the colors that lie on the line connecting the colors in the output pair that is used to specify the mapping. This color relation, i.e., being a neutral color, is what characterizes the specified mapping as a color cast removing mapping.

The system modifies the specified mapping such that no protected color is clipped (step 240). The mapping can be modified, for example, by using the mapping modifier 117 (FIG. 1). The mapping modifier can verify whether the specified mapping associates any of the protected colors with a mapped protected color outside of the color space according to the specified mapping. If it is determined that at least one protected color is mapped to a mapped color outside of the color space, the specified mapping can be modified to ensure that no protected color is associated with mapped color outside of the color space.

In one implementation, the mapping modifier optimizes contrast of the modified mapping. For example, the mapping modifier can generate a modified mapping that both provides an optimal contrast and avoids clipping mapped protected colors. An optimal contrast is reached when mapped protected colors occupy an optimal volume, i.e., a maximal volume that is subject to some constraints. Optionally, the mapping modifier can optimize contrast even if all protected colors are associated with colors inside the color space according to the specified color mapping 113. For example, a region that includes all protected colors can be "stretched out" to cover the entire color space.

To obtain the modified mapping, the mapping modifier can apply a second mapping ("M2") subsequently to the specified mapping ("M1"). To avoid loss of detail in the modified mapping, the second mapping can be injective, i.e., a one-to-one mapping. If the specified mapping M1 associates a protected color ("pc") with a mapped protected color ("mpc"), the second mapping M2 can be constructed to associate the mapped protected color one-to-one to a color ("c") inside the color space, i.e., $c = M2(mpc) = M2(M1(pc))$.

In this implementation, the resulting modified mapping ("M3") is obtained by concatenation of the specified mapping and the second mapping, i.e., M3=M2(M1). In an alternative implementation, the mapping modifier can alter the coefficients in the specified mapping, instead of applying a second mapping.

The second mapping can be a separable linear mapping that, for example, optimizes contrast in an RGB space. The second mapping can "compress" or "stretch out" each component uniformly until all protected colors are inside the color space. To define the uniform contrast adjustment, the mapping modifier can determine a minimum and a maximum component value of mapped protected colors, and use the minimum and maximum component values for each component to construct the second mapping. By uniformly adjusting the contrast, the second mapping does not introduce any new color cast, i.e., neutral colors (i.e., shades of gray) will be mapped to other neutral colors. Because no new color cast is introduced, such second mapping can be used to protect colors from clipping when the specified mapping is removing a color cast. An example of contrast optimizing second mapping is shown in FIG. 4B.

Optionally, the second mapping can be constructed to maintain other color relations or constraints than keeping neutral colors neutral. For example, if the purpose of the specified mapping is to adjust brightness, the second mapping may be constructed such that it does not alter the average brightness. Alternatively, the specified mapping can create, not remove, a color cast, e.g., by mapping the true black and white colors to output "black" and output "white" colors. The second mapping can be constructed to maintain the created color cast while protecting the protected colors from clipping. For example, the second mapping can compress the line between the output "black" and "white" colors without altering the direction of the line in the color space. An exemplary method for modifying a color mapping is discussed with reference to FIG. 5.

After modifying the specified mapping, the system adjusts colors in the image according to the modified mapping (step 250). Because the modified mapping associates all protected colors with colors inside the color space, the color adjustment does not clip any original color that is within the set of protected colors. For example, if the set of protected colors is a protected region in the color space, all colors in the image that are inside the protected region will be adjusted without clipping. Adjusting the colors can include rounding mapped colors to a nearest color that is representable with a limited precision in the image.

Optionally, the color protection tool 112 can update the set of protected colors after a color adjustment in the image, so that the protected set can be preserved for future use after being adapted for the modified image. For example, the color protection tool can replace the protected colors with the mapped protected colors according to the modified mapping. This will prevent subsequent color adjustments from clipping colors that were within the original protected set.

Figure 3:
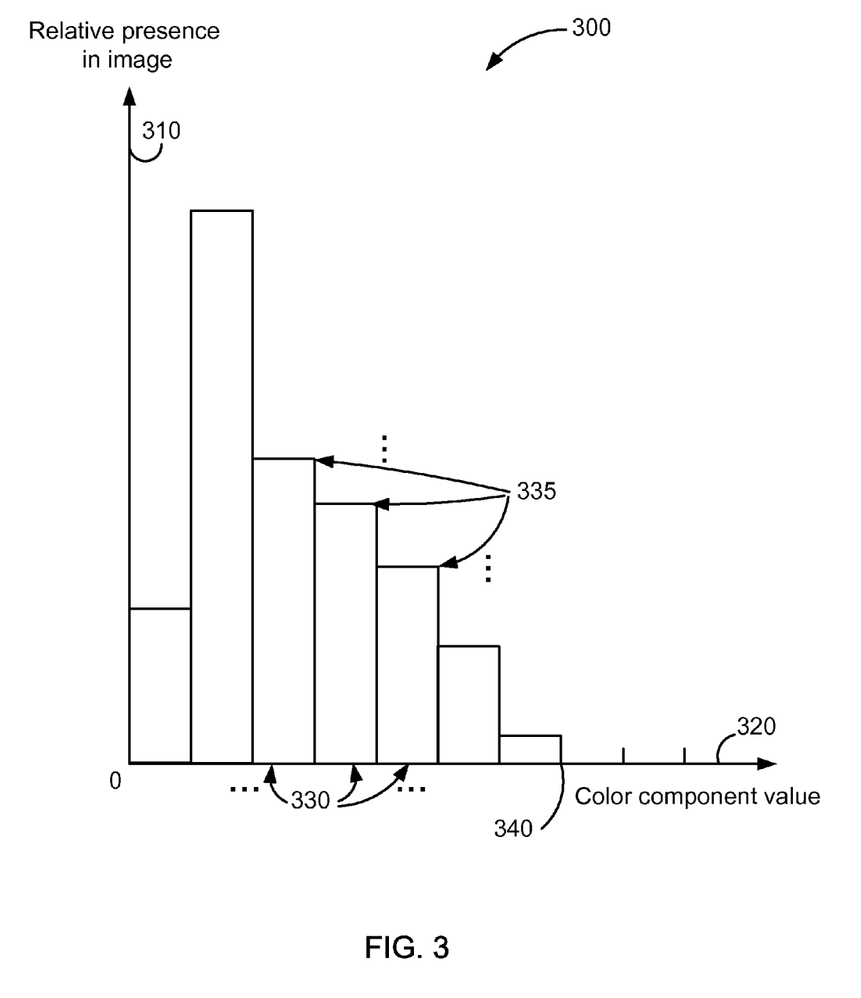
FIG. 3 illustrates a histogram representing relative presence of a color component in an image as a function of the component value.

In FIG. 3, an exemplary histogram 300 illustrates relative presence 310 of a color component in an image as a function of the component's value. The histogram 300 can be used for identifying color component values for protected colors. For example, the color component can be the Green component in RGB color space, and the horizontal axis can represent the Green component values 320. The histogram 300 illustrates the relative presence 310 of the Green component values of, e.g., color pixels in an image.

The histogram 300 can be generated by dividing the green component values 320 into small intervals 330. For each interval, a histogram value 335 is obtained by counting pixels in the image, which have a color with a Green component value in the interval. According to the histogram 300, most pixels have relatively small Green component values, and, after a maximum component value 340, no Green component is used in the image.

The histogram 300 can be used, for example, by the color editor 110 (FIG. 1) to identify a protected range in a color component of the color space (in this example, the Green component). In one implementation, the histogram is presented to the user on a display device, and the user can select a protected range based on a visual inspection of the histogram. Alternatively, system 100 can automatically define a protected range based on the histogram. In the example illustrated in FIG. 3, the system might identify the range from zero to the maximum component value 340. This would protect the entire range of green component values present in the image from clipping during the color adjustment. Similar histograms in the remaining color components can be used to define protected ranges in those components as well.

Optionally, a relative presence histogram can be generated for a function of color component values. For example, the function can characterize the darkness of colors represented by the color component values. By generating a relative presence histogram for darkness values of colors in an image, the mapping generator 112 (FIG. 1) can obtain a typical dark and light color to specify color mappings that include contrast adjustment.

FIGS. 4A and 4B schematically illustrate a color mapping in a color space 400 in accordance with one aspect of the invention. The color space 400 is a simplified space with only two color components, a first color component 410 and a second color component 420, where the color space occupies an area defined by the "black" and "white" points 442, 444. In the color space 400, a true white color 442 and a true black color 444 are connected by neutral colors along the diagonal 440.

As shown in FIG. 4A, a mapping M1 has been specified to remove a color cast and to optimize color contrast in the image. The mapping M1 associates an input "black" color 434 with the true black color 444, and an input "white" color 432 with the true white color 442. The mapping M1 is a linear separable mapping that maps a line 430 connecting the input "white" and "black" colors to the diagonal 440 of gray colors. However, the mapping associates a protected color 460 with a mapped protected color 461 that is outside of the color space 400. If the mapping M1 is used to adjust colors in an image using the color space 400, the protected color 460 will be clipped.

As shown in FIG. 4B, the mapping M1 can be modified by applying a second mapping M2 subsequently so that a composite result of the mappings M1 and M2 is a modified mapping M3. The second mapping M2 associates the mapped protected color 461 with a new mapped protected color 462 that is inside the color space 400. The second mapping M2 is constructed such that neutral colors are mapped to neutral colors. For example, the true white color 442 is mapped to a light gray color 452 and the true black color 444 remains unchanged due to the second mapping M2. Therefore, the modified mapping M3 maps the input black and input white colors to neutral colors, i.e., the modified mapping M3 can be used to remove color cast while avoiding clipping the protected color 460 due to the adjustment. Furthermore, the contrast of the modified mapping M3 has been optimized, because the second mapping leaves the true black color unchanged, and the mapped protected color 461 is mapped to a new mapped protected color 462 that is just inside the color space 400.

Figure 5:
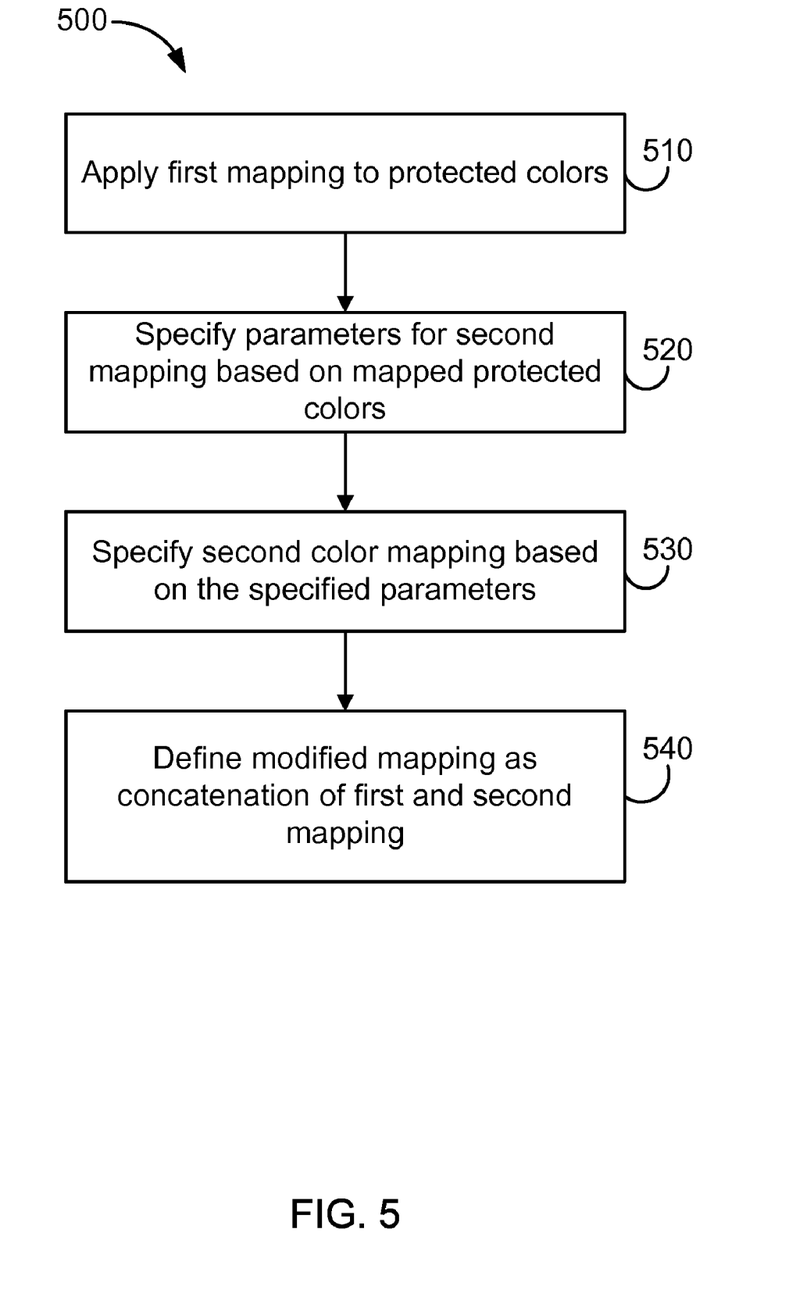
FIG. 5 is a flow diagram showing a method for modifying a color mapping.

FIG. 5 shows an exemplary method 500 for modifying a color mapping according to one aspect of the invention. In this example, all mappings are separable linear mappings, and all regions in the color space are defined by a range of values in each component of a color space.

The method 500 uses a region of protected colors P, a first color mapping M1, a line L and a volume O in the color space. The first mapping M1 can associate colors in the color space with mapped colors that are outside of the color space. The line L does not lie in any plane perpendicular to axes representing color components in the color space, and can be defined using a mathematical formula $$L(t) = a*t + b,$$

where a and b are specified on a per color component basis and the restriction on which planes it can lie in corresponds to requiring that a cannot be zero. The volume O is a "box-like" region such that at least some portion (other than a point) of the line L lies within the volume O.

The method 500 generates a modified color mapping M3 from the first color mapping such that:

if M1(x) is on the line L then M3(x) is on L for all colors x;

M3 is related to M1 by a separable linear color mapping;

for all colors p in the protected region P, M3(p) is in the volume O;

for all colors p and q in the protected region P, if M1(p) is distinct from M1(q), then mapped protected color M3(p) is distinct from M3(q); and the volume consumed by M3(p) for all colors p in the protected region P, is as large as possible.

M1 is applied to each color P in the protected region P (step 510) to produce a set of mapped protected colors Q. If P is a "box-like" region and M1 is a separable mapping, the region of the mapped protected colors Q can also be bounded by a box, thereby allowing to define the minimum and maximum values in each component and have those correspond to actual mapped colors. For example in an RGB space, the minimum and maximum values can be Qmin_red and Qmax_red for the Red component, Qmin_green and Qmax_green for the Green component, and Qmin_blue and Qmax_blue for the Blue component.

Based on the mapped protected colors, parameters are specified for a second mapping (step 520), for example, parameters c and d where c is positive and as large as possible such that:

$O\text{min\_red} <= c*(Q\text{min\_red} - b\_\text{red}) + a\_\text{red}*d + b\_\text{red}$;

$O\text{max\_red} >= c*(Q\text{max\_red} - b\_\text{red}) + a\_\text{red}*d + b\_\text{red}$;

$O\text{min\_green} <= c*(Q\text{min\_green} - b\_\text{green}) + a\_\text{green}*d + b\_\text{green}$;

$O\text{max\_green} >= c*(Q\text{max\_green} - b\_\text{green}) + a\_\text{green}*d + b\_\text{green}$;

$O\text{min\_blue} <= c*(Q\text{min\_blue} - b\_\text{blue}) + a\_\text{blue}*d + b\_\text{blue}$; and $O\text{max\_blue} >= c*(Q\text{max\_blue} - b\_\text{blue}) + a\_\text{blue}*d + b\_\text{blue}$.

Solving these equations is a standard linear programming problem if a solution exists. For example, linear programming techniques can find an optimum solution. The existence of a solution can be shown by the following observations. Because the volume O contains some portion of the line L, without loss of generality in the definition of L, it can be assumed that (b_red, b_green, b_blue) lies within O, since the point b can be any point on L. With this restriction on the definition of L, the values c=0 and d=0 give us the b values for each of the expressions above and those will be in bounds.

A slightly more complicated solution with positive c (as opposed to c=0) can be derived by requiring that b not lie at the boundary of O. We can then use an infinitesimal value for c and still set d to zero and have a solution.

Based on the specified parameters, the second color mapping is specified (step 530). By using the parameters c and d, a separable linear color mapping M2 can be defined as follows:

$M2\_\text{red}(x) = c*(x\_\text{red} - b\_\text{red}) + a\_\text{red}*d + b\_\text{red}$, $M2\_\text{green}(x) = c*(x\_\text{green} - b\_\text{green}) + a\_\text{green}*d + b\_\text{green}$, and $M2\_\text{blue}(x) = c*(x\_\text{blue} - b\_\text{blue}) + a\_\text{blue}*d + b\_\text{blue}$.

A modified color mapping is defined as concatenation of the first and second mappings (step 540), i.e., M3(x)=M2(M1(x)).

To see that this definition works, the following case can be considered. The parameters c and d have been chosen such that mapping the colors in Q through M2 produces colors in O. Furthermore, the linearity of M2 together with c being non-zero preserves injective behavior. Maximizing c optimizes contrast. The remaining requirement is that if M1(x) is on the line L then so is M3(x). This corresponds to showing that if x is on L then M2(x) is on L as well.

If x is on L, then there exists a value t such that x_red=a_red*t+b_red, etc.

$$M2\_\text{red}(x) = c*(x\_\text{red} - b\_\text{red}) + a\_\text{red}*d + b\_\text{red}$$

$$= c*(a\_\text{red}*t + b\_\text{red} - b\_\text{red}) + a\_\text{red}*d + b\_\text{red}$$

$$= c*(a\_\text{red}*t) + a\_\text{red}*d + b\_\text{red}$$

$$= a\_\text{red}*(c*t + d) + b\_\text{red}.$$

Similarly:

$M2\_\text{green}(x) = a\_\text{green}*(c*t+d) + b\_\text{green}$, and $M2\_\text{blue}(x) = a\_\text{blue}*(c*t+d) + b\_\text{blue}$.

Thus, if x is on L with parameter value t, then M2(x) is on L with parameter value c*t+d.

Therefore, the modified mapping M3 satisfies all requirements.

The above discussion can be generalized when the protected region is not box-like, and M1 is not separable. In this case, Q may also be different from a box-like region. For example, the generalization can introduce a cover box around Q and, because too many colors may be protected by the cover box, accept inferior contrast enhancement. Alternatively, a complex representation can be introduced for Q. The complex representation typically results in a large number of inequalities, but these inequalities can still be solved using linear programming techniques.

The preceding discussion describes color mappings that associate colors in a source color space with mapped colors using the same color components that define the source color space. However, the mapped colors be represented using different color components defining a destination color space. In such implementations, the techniques described above can be generalized, for example, by using transformations that describe the relation between the source and the destination color spaces. For example, the destination color space can be first transformed into an RGB color space where the techniques described above can be directly applied. After obtaining a modified mapping in the RGB space, this mapping can be transformed back to the destination color space.

In one implementation, abstract neutral colors are converted to the destination color space. In the case of RGB, this provides three functions from grayscale values to red, green, and blue values. These functions are inverted and applied to the colors in the destination space to get colors in a normalized destination space—i.e., a space in which a color with equal red, green, and blue component values is a neutral color, i.e., gray. Optionally, the tonal reproduction curve for the colors can also be normalized at this point to get a space with a particular (e.g., gamma 1) response curve. A color compression is performed as described above in the normalized space, and the normalized space is mapped back to the destination space. In brief, the resulting map can be described as: source colors=>map 1=>normalization=>compression=>denormalization.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

By way of example, a printing device implementing an interpreter for a page description language, such as the PostScript® language, includes a microprocessor for executing program instructions (including font instructions) stored on a printer random access memory (RAM) and a printer read-only memory (ROM) and controlling a printer marking engine. The RAM is optionally supplemented by a mass storage device such as a hard disk. The essential elements of a computer are a processor for executing instructions and a memory. A computer can generally also receive programs and data from a storage medium such as an internal disk or a removable disk. These elements will also be found in a conventional desktop or workstation computer as well as other computers suitable for executing computer programs implementing the methods described here, which can be used in conjunction with any digital print engine or marking engine, display monitor, or other raster output device capable of producing color or gray scale pixels on paper, film, display screen, or other output medium.

The invention has been described in terms of particular embodiments. Other embodiments are within the scope of the following claims. For example, the steps of the invention can be performed in a different order and still achieve desirable results. The techniques described above operate in terms of abstract mappings. In particular implementations, these mappings may be subject to rounding and/or clipping when applied to a particular color transformation due to precision or range requirements of a particular system.

What is claimed is:

1. A computer program product, tangibly embodied on a computer-readable medium including instructions operable to cause data processing apparatus to:

receive an image;

identify a set of protected colors within a source color space within the image, the protected colors being a subset of the colors in the source color space, and wherein the protected colors are identified by a user through a graphical user interface;

specify a first color mapping that associates each color in the source color space with a tuple of mapped component values, each mapped component value being a value for a corresponding component in a destination color space, the destination color space having a range of permissible component values for each of a plurality of components of the destination color space;

determine if the mapped protected color component values include at least one mapped protected color component value that is outside the range of permissible values for the destination color space, and:

when it is determined that the mapped protected color component values do not include at least one mapped protected color component value that is outside the range of permissible values for the protected color space, apply the first color mapping to the image to generate a modified image, and when it is determined that the mapped protected color component values do include at least one mapped protected color component value that is outside the range of permissible values for the protected color space, specify an injective second color mapping using the mapped protected color component values, the injective second color mapping associating the tuples of mapped protected color component values with tuples of modified mapped protected color component values, each of the modified mapped protected color component values being within the range of permissible values for the destination color space, and construct a third color mapping, the third color mapping being a concatenation of the injective second color mapping with the first color mapping, the third color mapping being constructed such that under the third color mapping, each color in the set of protected colors is associated with a distinct modified mapped protected color inside the destination color space, and applying the third color mapping to the image to generate a modified image.

2. The computer program product of claim 1, wherein: the source color space is an RGB color space.

3. The computer program product of claim 1, wherein: the destination color space is defined by different color components than the source color space.

4. The computer program product of claim 1, wherein: the destination color space is defined by different color component value ranges than the source color space.

5. The computer program product of claim 1, wherein: the third color mapping is constructed such that the colors in the first set of colors are associated with colors corresponding to an optimal contrast in the destination color space.

6. The computer program product of claim 1, wherein instructions operable to cause the data processing apparatus to use the first set of colors and the first color mapping to construct a third color mapping include instructions operable to cause the data processing apparatus to:
map each of the color ranges according to the first color mapping to define mapped color range values;
identify a minimum value and a maximum value of the mapped color range values;
define a second color mapping that is operable to transform the minimum value to the dark mapped color in each color component and the maximum value to the light mapped color in each color component; and
define the third color mapping as a function of the first color mapping and the second color mapping.

7. A system comprising:
a user input device, a display, a memory device, and a processor programmed to:
receive an image;
identify a set of protected colors within a source color space within the image, the protected colors being a subset of the colors in the source color space, and wherein the protected colors are identified by a user through a graphical user interface;
specify a first color mapping that associates each color in the source color space with a tuple of mapped component values, each mapped component value being a value for a corresponding component in a destination color space, the destination color space having a range of permissible component values for each of a plurality of components of the destination color space;
determine if the mapped protected color component values include at least one mapped protected color component value that is outside the range of permissible values for the destination color space, and:
when it is determined that the mapped protected color component values do not include at least one mapped protected color component value that is outside the range of permissible values for the protected color space, apply the first color mapping to the image to generate a modified image, and
when it is determined that the mapped protected color component values do include at least one mapped protected color component value that is outside the range of permissible values for the protected color space,
specify an injective second color mapping using the mapped protected color component values, the injective second color mapping associating the tuples of mapped protected color component values with tuples of modified mapped protected color component values, each of the modified mapped protected color component values being within the range of permissible values for the destination color space, and
construct a third color mapping, the third color mapping being a concatenation of the injective second color mapping with the first color mapping, the third color mapping being constructed such that under the third color mapping, each color in the set of protected colors is associated with a distinct modified mapped protected color inside the destination color space, and applying the third color mapping to the image to generate a modified image.

8. The system of claim 7, wherein: the source color space is an RGB color space.

9. The system of claim 7, wherein: the destination color space is defined by different color components than the source color space.

10. The system of claim 7, wherein: the destination color space is defined by different color component value ranges than the source color space.

11. The system of claim 7, wherein: the third color mapping is constructed such that the colors in the first set of colors are associated with colors corresponding to an optimal contrast in the destination color space.

12. The system of claim 7, wherein instructions operable to cause the data processing apparatus to use the first set of colors and the first color mapping to construct a third color mapping include instructions operable to cause the data processing apparatus to:
map each of the color ranges according to the first color mapping to define mapped color range values;
identify a minimum value and a maximum value of the mapped color range values;
define a second color mapping that is operable to transform the minimum value to the dark mapped color in each color component and the maximum value to the light mapped color in each color component; and
define the third color mapping as a function of the first color mapping and the second color mapping.

13. A computer-implemented method, comprising:
receiving an image;
identifying a set of protected colors within a source color space within the image, the protected colors being a subset of the colors in the source color space, and wherein the protected colors are identified by a user through a graphical user interface;
specifying a first color mapping that associates each color in the source color space with a tuple of mapped component values, each mapped component value being a value for a corresponding component in a destination color space, the destination color space having a range of permissible component values for each of a plurality of components of the destination color space;
determining if the mapped protected color component values include at least one mapped protected color component value that is outside the range of permissible values for the destination color space, and:
when it is determined that the mapped protected color component values do not include at least one mapped protected color component value that is outside the range of permissible values for the protected color space, applying the first color mapping to the image to generate a modified image, and
when it is determined that the mapped protected color component values do include at least one mapped protected color component value that is outside the range of permissible values for the protected color space, specifying an injective second color mapping using the mapped protected color component values, the injective second color mapping associating the tuples of mapped protected color component values with tuples of modified mapped protected color component values, each of the modified mapped protected color component values being within the range of permissible values for the destination color space, and constructing a third color mapping, the third color mapping being a concatenation of the injective second color mapping with the first color mapping, the third color mapping being constructed such that under the third color mapping, each color in the set of protected colors is associated with a distinct modified mapped protected color inside the destination color space, and applying the third color mapping to the image to generate a modified image.

14. The method of claim 13, wherein:
the source color space is an RGB color space.

15. The method of claim 13, wherein:
the destination color space is defined by different color components than the source color space.

16. The method of claim 13, wherein:
the destination color space is defined by different color component value ranges than the source color space.

17. The method of claim 13, wherein:
the third color mapping is constructed such that the colors in the first set of colors are associated with colors corresponding to an optimal contrast in the destination color space.

18. The method of claim 13, wherein constructing a third color mapping includes:

mapping each of the color ranges according to the first color mapping to define mapped color range values;

identifying a minimum value and a maximum value of the mapped color range values;

defining a second color mapping that is operable to transform the minimum value to the dark mapped color in each color component and the maximum value to the light mapped color in each color component; and defining the third color mapping as a function of the first color mapping and the second color mapping.

* * * * *

UNITED STATES PATENT AND TRADEMARK OFFICE
CERTIFICATE OF CORRECTION

PATENT NO. : 7,567,705 B1 Page 1 of 1
APPLICATION NO. : 11/773116
DATED : July 28, 2009
INVENTOR(S) : Mark Hamburg It is certified that error appears in the above-identified patent and that said Letters Patent is hereby corrected as shown below:

On the Title page, under Item (*) Notice: delete "This patent is subject to a terminal disclaimer."

Signed and Sealed this

Twentieth Day of April, 2010

David J. Kappos
*Director of the United States Patent and Trademark Office*